United States Patent
Cheung et al.

(10) Patent No.: US 11,045,929 B1
(45) Date of Patent: Jun. 29, 2021

(54) ANGLE SCREW FEEDING MODULE (71) Applicant: Bright Machines, Inc., San Francisco, CA (US)

(72) Inventors: Dason Cheung, Fremont, CA (US); Murad Kurwa, San Jose, CA (US)

(73) Assignee: Bright Machines, Inc., San Francisco, CA (US)

( * ) Notice: Subject to any disclaimer, the term of this patent is extended or adjusted under 35 U.S.C. 154(b) by 437 days.

(21) Appl. No.: 15/139,244

(22) Filed: Apr. 26, 2016

(51) Int. Cl.
*B25B 23/04* (2006.01)
*B23P 19/06* (2006.01)
*B25B 23/10* (2006.01)
*B23P 19/00* (2006.01)

(52) U.S. Cl.
CPC ............ *B25B 23/04* (2013.01); *B23P 19/006* (2013.01); *B25B 23/10* (2013.01)

(58) Field of Classification Search
None
See application file for complete search history.

(56) References Cited

U.S. PATENT DOCUMENTS

| | | | | |
|---|---|---|---|---|
| 2,534,140 A | * | 12/1950 | Moore | B25B 23/04 138/133 |
| 2,904,084 A | * | 9/1959 | Kruk | B25B 21/00 79/18 |
| 3,583,451 A | * | 6/1971 | Dixon | B23P 19/006 29/240 |
| 3,952,920 A | | 4/1976 | Bergman | |
| 4,002,265 A | * | 1/1977 | Dixon | B25B 23/04 221/210 |
| 4,356,619 A | | 11/1982 | Snyder | |
| 4,592,495 A | | 6/1986 | Toda | |
| 4,668,097 A | | 5/1987 | Nygren | |
| 4,691,419 A | | 9/1987 | Keeler | |
| 4,726,114 A | | 2/1988 | Staviski | |
| 4,776,242 A | * | 10/1988 | Poux | B23P 19/004 81/432 |
| 4,835,401 A | | 5/1989 | Sajiki | |
| 4,913,553 A | | 4/1990 | Falco | |
| 5,348,585 A | | 9/1994 | Weston | |
| 5,365,810 A | * | 11/1994 | Inaniwa | B23P 19/001 81/430 |
| 5,499,745 A | | 3/1996 | Derian | |
| 5,614,986 A | * | 3/1997 | Yoshikawa | G03B 27/6285 355/18 |
| 5,921,836 A | | 7/1999 | Nanto | |
| 6,296,903 B1 | | 10/2001 | Norris | |

(Continued)

FOREIGN PATENT DOCUMENTS

JP    H06-8032 B2    2/1994

OTHER PUBLICATIONS

Pick Up definition from Collins Dictionary found at collinsdictionary.com/dictionary/english/pick-up; Jun. 2018; attached as pdf.*

(Continued)

*Primary Examiner* — Brian D Keller
(74) *Attorney, Agent, or Firm* — Nicholson De Vos Webster & Elliott LLP; Judith Szepesi (57) ABSTRACT

An angle screw feeding device comprises a screw feeding unit, a screw transporting unit, and a screw driving unit. The device is able to be used with small screws. Further, the device is able to perform an automatic screwing action at any selected angles.

19 Claims, 7 Drawing Sheets

(56) References Cited

U.S. PATENT DOCUMENTS

| | | |
|---|---|---|
| 6,315,164 B1 | 11/2001 | Muhlbauer |
| 6,494,245 B1 | 12/2002 | Simone |
| 6,610,030 B1 | 8/2003 | Baxter |
| 6,619,508 B2 | 9/2003 | Balcome |
| 6,804,579 B1 | 10/2004 | Laski |
| 7,140,797 B2 | 11/2006 | Hunter |
| 8,192,198 B2 | 6/2012 | An |
| 8,444,025 B2 | 5/2013 | Greter |
| 8,528,785 B2 | 9/2013 | Naughton |
| 9,387,504 B2 | 7/2016 | Paetow, II |
| 9,624,023 B2 | 4/2017 | Williams |
| 9,709,226 B2 | 7/2017 | Ruiz et al. |
| 9,884,329 B2 | 2/2018 | Pringle, IV et al. |
| 10,264,720 B1 | 4/2019 | Cheung et al. |
| 2003/0089731 A1 | 5/2003 | Mayer |
| 2003/0164077 A1 | 9/2003 | Hill |
| 2004/0081759 A1 | 4/2004 | Maruyama |
| 2004/0134619 A1 | 7/2004 | Kojima |
| 2005/0214172 A1 | 9/2005 | Burgisser |
| 2006/0151531 A1 | 7/2006 | Tikusis |
| 2007/0090128 A1 | 4/2007 | Martin |
| 2009/0008246 A1 | 1/2009 | Reynolds |
| 2012/0067176 A1* | 3/2012 | Ota ................ B23P 19/006 81/57.37 |
| 2014/0261991 A1 | 9/2014 | Cucchi |
| 2015/0266224 A1 | 9/2015 | Bregonzio |
| 2015/0359149 A1 | 12/2015 | Itoh |
| 2016/0038655 A1 | 2/2016 | Weisman |

OTHER PUBLICATIONS

Definition of Pick Up from Dictionary.com/browse/pick-up; Jun. 2018; attached as pdf.*

Non-final office action dated Jan. 18, 2018, U.S. Appl. No. 14/747,937, filed Jun. 23, 2015; applicant: Dason Cheung, 17 pages.

Final office action dated Mar. 29, 2018, U.S. Appl. No. 14/717,71, filed May 20, 2015, applicant: Dason Cheung, 34 pages.

Non-final office action, U.S. Appl. No. 14/747,937, filed Jun. 23, 2015, applicant.: Dason Cheung, 11 pages.

Non-Final Office Action dated Jun. 11, 2019, U.S. Appl. No. 15/342,907, filed Nov. 3, 2016, Applicant: Dason Cheung, 20 pages.

Final Office Action dated Dec. 6, 2019, U.S. Appl. No. 15/342,907, filed Nov. 3, 2016, applicant: Dason Cheung, 14 pages.

* cited by examiner

Fig. 6B
Right Angle Screwing

Fig. 6C
45 Degree Screwing

Fig. 6A
Bottom Screwing

Fig. 7

ANGLE SCREW FEEDING MODULE

FIELD OF THE INVENTION

The present invention relates to the field of machine automation. More specifically, the present invention relates to an automatic feeding screw driver.

BACKGROUND OF THE INVENTION

In a high volume production industry, a screw feeding system is used to improve efficiency for manufacturing. In the traditional automation industry, a screw driver attached with a tube is used to feed screws from a feeding unit to a nozzle of the screw driver, which saves time by eliminating the screw driver from traveling back to the screw feeding unit to pick up the screw. However, this type of screw driver only works on large screws, screwing on the surface only, does not fit for small devices or any counter bore hole.

SUMMARY OF THE INVENTION

A method of and device for automatically feeding screws and automatic screwing is able to perform on small screws. The device can be combined with a screw feeding unit or vibrational bowl. The device is advantageous in that it can pick up screws from a feeding unit at any angle (e.g., 360 degrees). In some embodiments, the device is set for multiple predetermined angles and is further adjustable from 0-180 degrees. In some embodiments, the device picks up the screws from the feeding unit and bowl feed to an angle feeding module, which can be detachable and mounted on any location close to a screw driving unit and a work piece.

In an aspect, a screw feeding device comprises a screw feeding unit and a screw driving unit having an electrical screw driver, wherein the electrical screw driver may be mounted in a straight or fixed angle depending on the end product design and moves in a circular direction. In some embodiments, the electrical screw driver is configured to pick up a screw in any predetermined angles in the circular direction. In other embodiments, the electrical screw driver moves in the circular direction between 1 to 180 degree of a moving angle. In some other embodiments, the electrical screw driver moves in a complete circle. In some embodiments, the device further comprises a screw transporting unit configured to move a screw from the screw feeding unit to an angle screw feeding module. In other embodiments, the screw transporting unit comprises a pneumatic cylinder and a vacuum pick up nozzle. In some other embodiments, the screw feeding device comprises a vacuum indicator configured to indicating a screw picking up event.

In another aspect, a method of automating a screwing process comprises providing a screw from a screw feeding unit, transporting the screw from the screw feeding unit to a screw driver, moving the screw driver to a predetermined angle, and performing a screwing action at the predetermined angle using the screw driver. In some embodiments, the moving comprises rotating. In other embodiments, the rotating comprises rotating along an axis on an angle screw feeding module. In some other embodiments, the method further comprises picking up the screw from the screw feeding unit using a first vacuum nozzle. In some embodiments, the vacuum nozzle couples with a first pneumatic cylinder. In other embodiments, the first pneumatic cylinder moves in a vertical direction. In some other embodiments, the method further comprises transporting the screw from the screw feeding unit to a screw blowing unit. In some embodiments, the method further comprises horizontally transporting the screw using a second pneumatic cylinder.

In another aspect, a screw feeding device comprises a screw feeding source, a first vacuum nozzle coupling with a first pneumatic cylinder, wherein the first vacuum nozzle is configured to pick up a screw from the screw feeding source by generating a negative pressure and the first pneumatic cylinder is configured to move the screw in a picking up action, a second pneumatic cylinder configured to transport the screw to be picked up by a second vacuum nozzle, an angle screw feeding unit configured to transport the screw from the second vacuum nozzle to an electrical screw driver, and a rotating structure configured to set the screw driver in a predetermined angle.

In some embodiments, the screw feeding source comprises a rotating disk. In other embodiments, the electrical screw driver picks up the screw by using a negative pressure.

Other features and advantages of the present invention will become apparent after reviewing the detailed description of the embodiments set forth below.

BRIEF DESCRIPTION OF THE DRAWINGS

Embodiments will now be described by way of examples, with reference to the accompanying drawings which are meant to be exemplary and not limiting. For all figures mentioned herein, like numbered elements refer to like elements throughout.

DETAILED DESCRIPTION OF THE PREFERRED EMBODIMENT

Reference is made in detail to the embodiments of the present invention, examples of which are illustrated in the accompanying drawings. While the invention is described in conjunction with the embodiments below, it is understood that they are not intended to limit the invention to these embodiments and examples. On the contrary, the invention is intended to cover alternatives, modifications and equivalents, which can be included within the spirit and scope of the invention as defined by the appended claims. Furthermore, in the following detailed description of the present invention, numerous specific details are set forth in order to more fully illustrate the present invention. However, it is apparent to one of ordinary skill in the prior art having the benefit of this disclosure that the present invention can be practiced without these specific details. In other instances, well-known methods and procedures, components and processes have not been described in detail so as not to unnecessarily obscure aspects of the present invention. It is, of course, appreciated that in the development of any such actual implementation, numerous implementation-specific decisions must be made in order to achieve the developer's specific goals, such as compliance with application and business related constraints, and that these specific goals vary from one implementation to another and from one developer to another. Moreover, it is appreciated that such a development effort can be complex and time-consuming, but is nevertheless a routine undertaking of engineering for those of ordinary skill in the art having the benefit of this disclosure.

Figure 1:
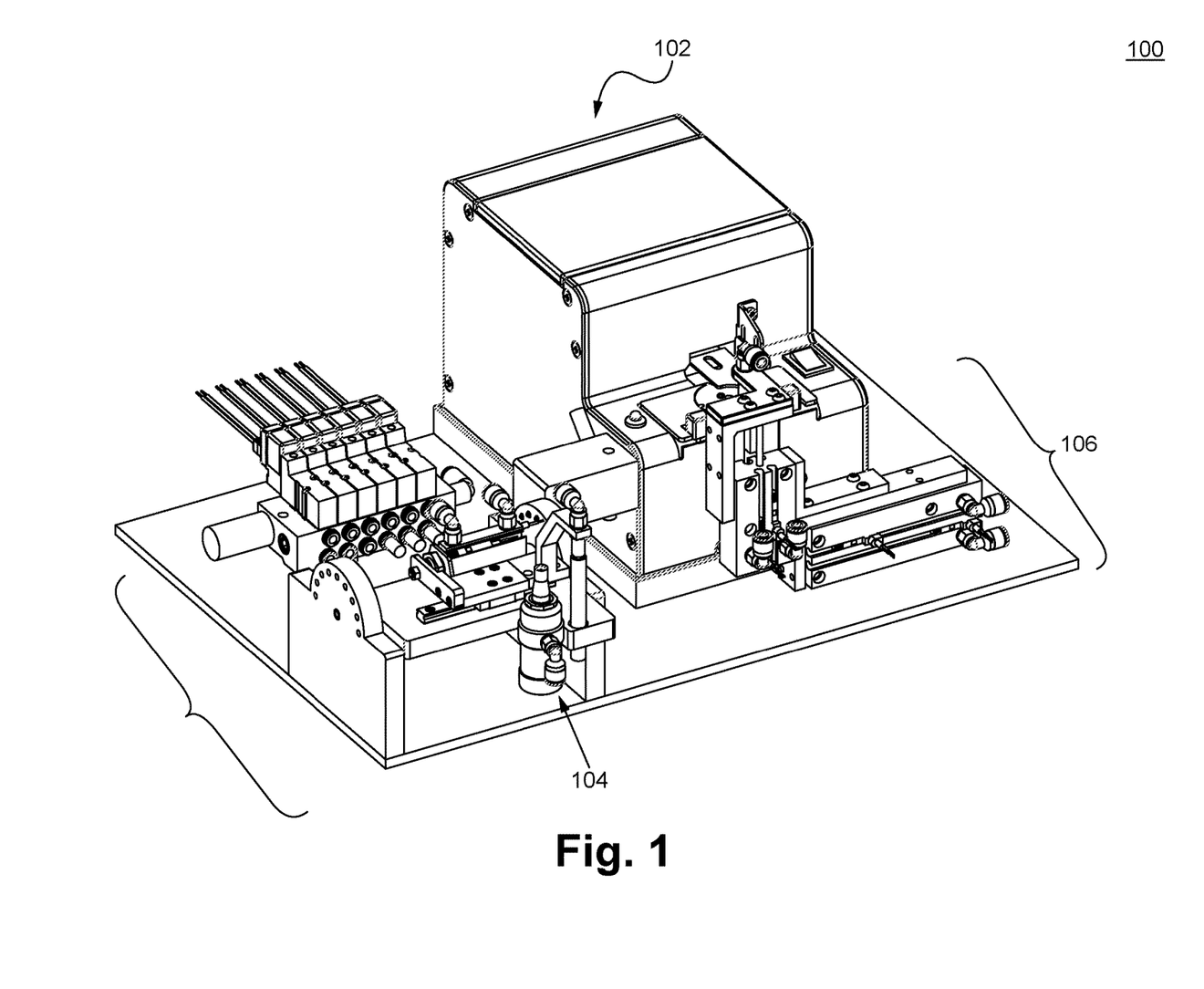
FIG. 1 illustrates an automatic screw feeding and screwing device in accordance with some embodiments of the present invention.

FIG. 1 illustrates an automatic screw feeding and screwing device 100 in accordance with some embodiments of the present invention. In some embodiments, the device 100 comprises a screw feeding unit 102, a screw driver unit 104, and a screw transporting unit 106.

Figure 2:
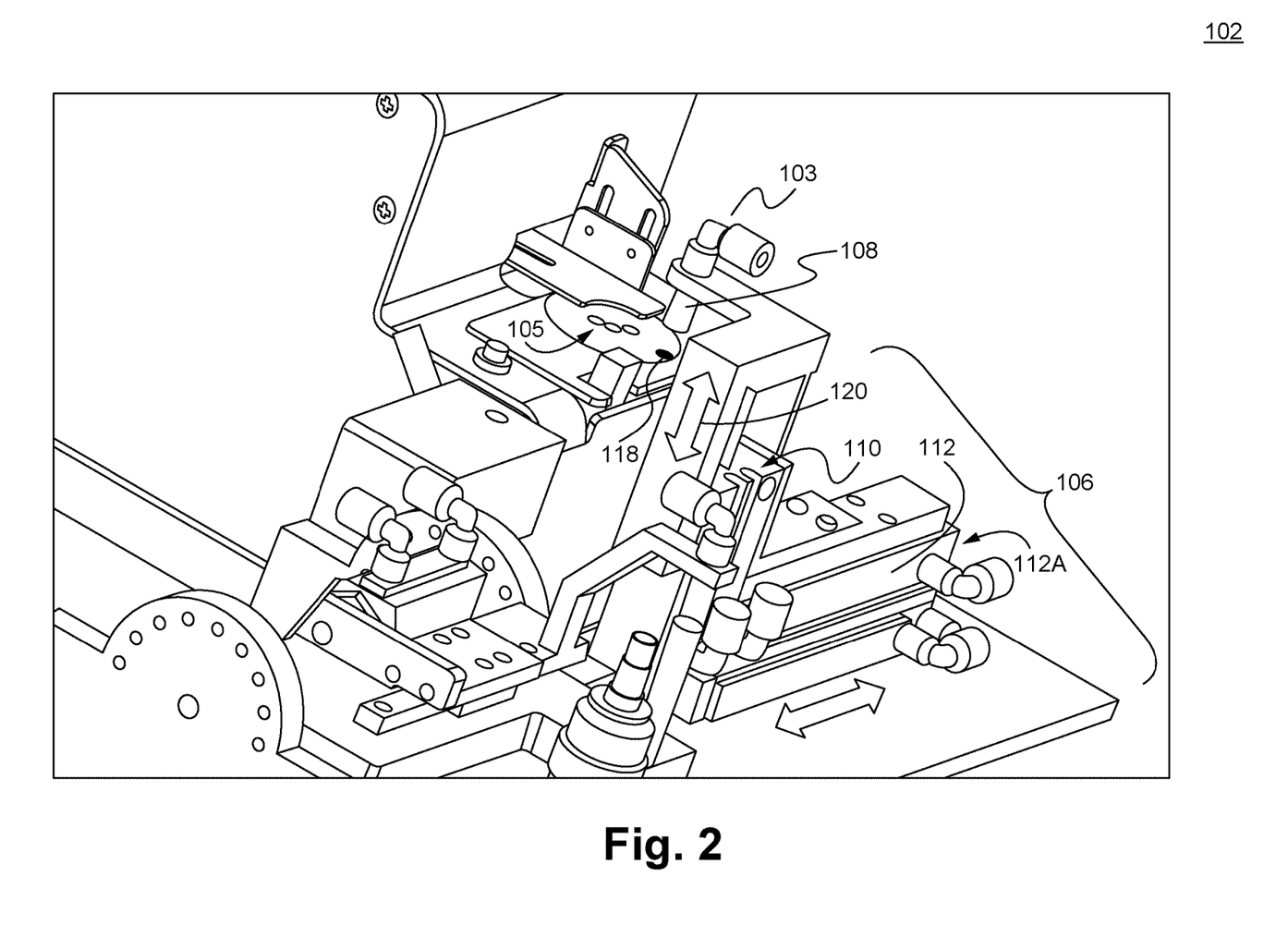
FIG. 2 illustrates the screw feeding unit in action in accordance with some embodiments of the present invention.

FIG. 2 illustrates the screw feeding unit 102 in action in accordance with some embodiments of the present invention. The device comprises a nozzle 108, which can be a vacuum pick up nozzle. Before starting actions, the nozzle 108 can be at a home position 103 (near the location of the screw 118 at the screw feeding turning disk 105), wherein a cylinder 110 is at an open position and a cylinder 112 is at a closed position 112A. In some embodiments, the cylinder 110 and the cylinder 112 comprise one or more pneumatic cylinders.

When the device is picking up a screw 118, the cylinder 110 is closed and vacuum is turned on, such that the screw 118 from the screw feeding unit can be picked up by the nozzle 108 vertically in a direction 120 to be in a lifted position. In some embodiments, the vacuum comprises a vacuum indicator sending a signal confirming a successful pick up of the screw 118.

Figure 3:
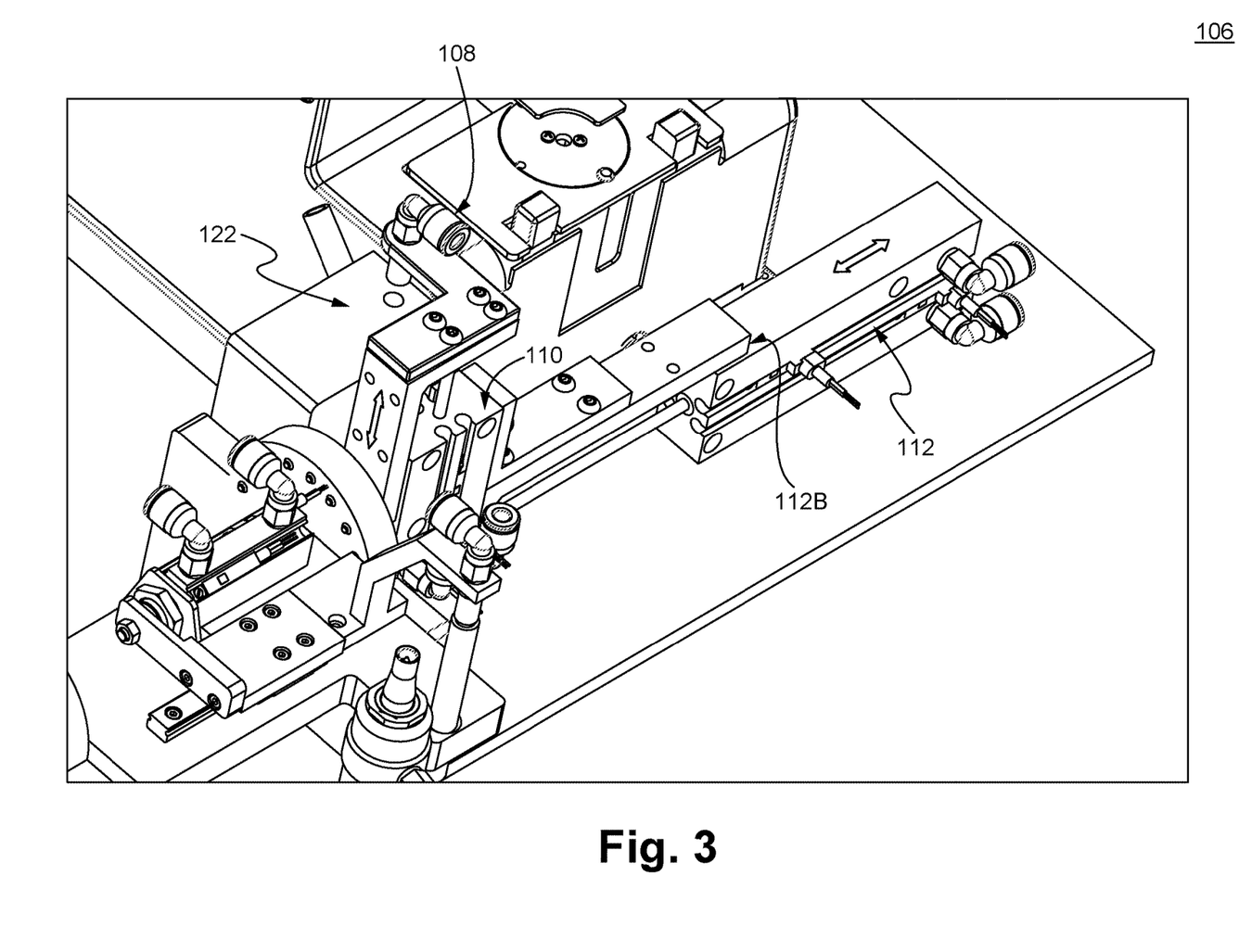
FIG. 3 illustrates the screw transporting unit in action in accordance with some embodiments of the present invention.

FIG. 3 illustrates the screw transporting unit 106 in action in accordance with some embodiments of the present invention. After the device 100 successfully picks up the screw as shown in FIG. 2, the cylinder 112 is back to an open position. The cylinder 112 is changed to an open position 112B and moves horizontally to a screw blow unit 122. Once the nozzle 108 moves from the screw feeding turning disk 105 to the screw blow unit 122, cylinder 112 is changed to a closed position and shuts off the vacuum, so that the screw drops into the screw blow unit 122, which awaits a signal from the screw driving unit 104 to blow the screw. Next, the cylinder 112 returns to the home position 103.

Figure 4:
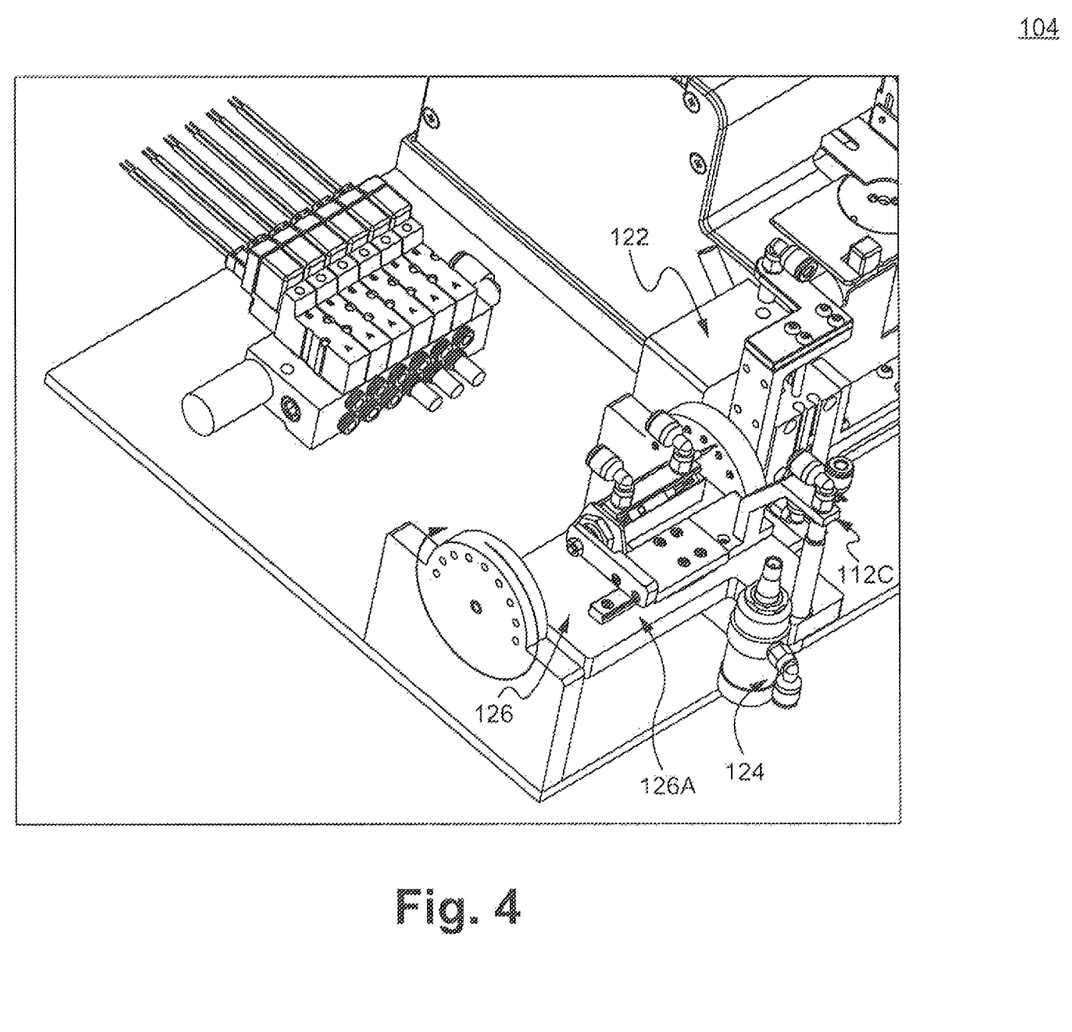
FIG. 4 illustrates the screw driving unit in action in accordance with some embodiments of the present invention.

FIG. 4 illustrates the screw driving unit 104 in action in accordance with some embodiments of the present invention. When a screw request is received, air of the screw blow unit 122 is turned on and screws are fed to the nozzle 112C from the screw blow unit 122. The nozzle 112C is on the angle screw feeding module 126. Next, the nozzle 112C turns on vacuum and hold the screw in place. In some embodiments, the vacuum indicator confirms/shows a successful screw pick up signal.

Figure 5:
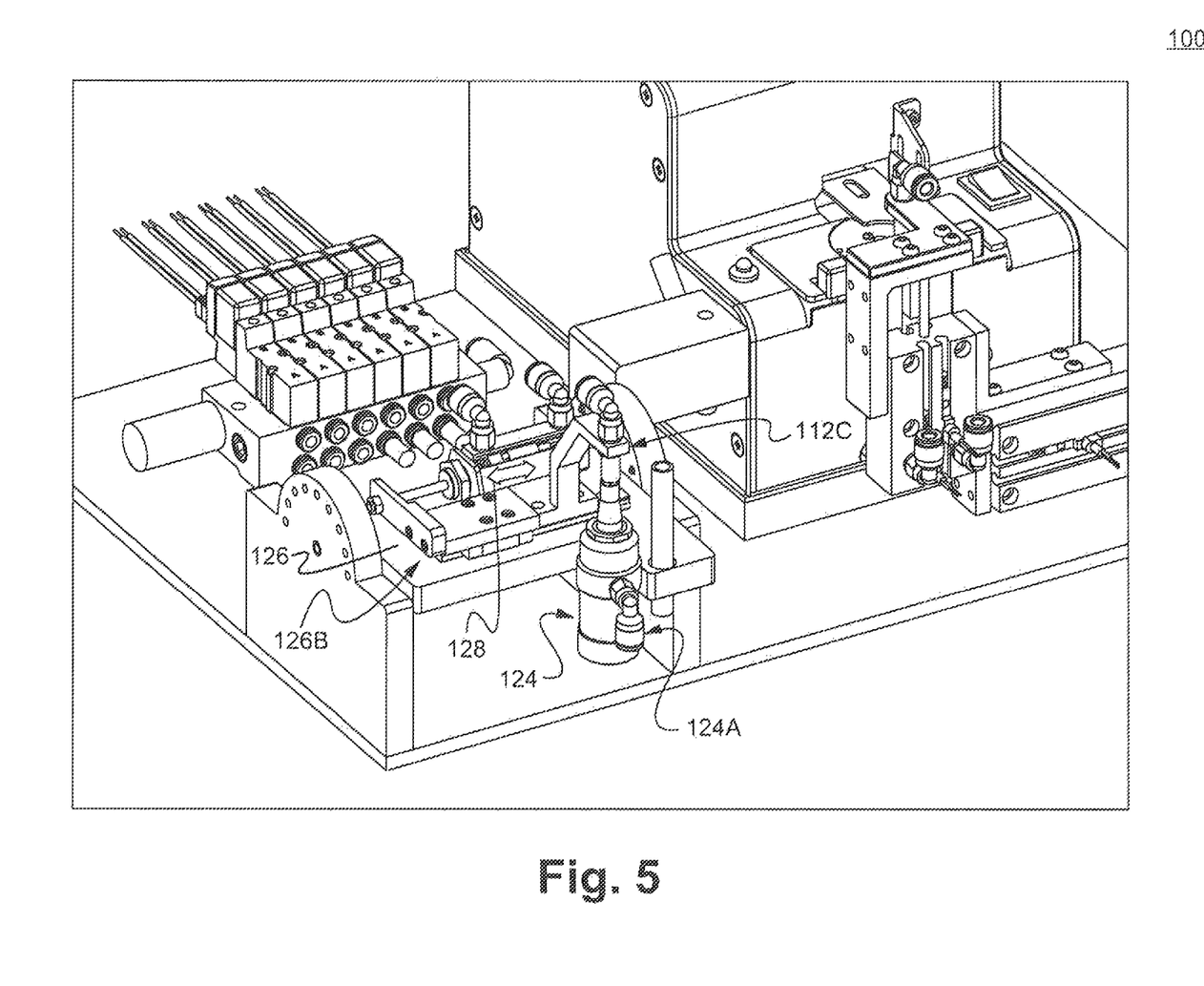
FIG. 5 illustrates the screw driving unit in further action in accordance with some embodiments of the present invention.

FIG. 5 illustrates the screw driving unit 104 in further action in accordance with some embodiments of the present invention. After the screw is picked up by the nozzle 112C, a cylinder 128 (e.g., a pneumatic cylinder) is opened and move the nozzle 112C to the position of a screw driver 124, which is an open position 126B of the cylinder 128. Next, nozzle 112C shuts off the vacuum and the screw driver vacuum port 124A is turned on, such that the screw is picked up by the screw driver 124 from the angle screw feeding module 126. In some embodiments, the vacuum indicator confirms/shows an successful screw pick up signal. After the pick up of the screw by the screw driver 124, the cylinder 128 moves back to a close position 126A.

Figure 6A:
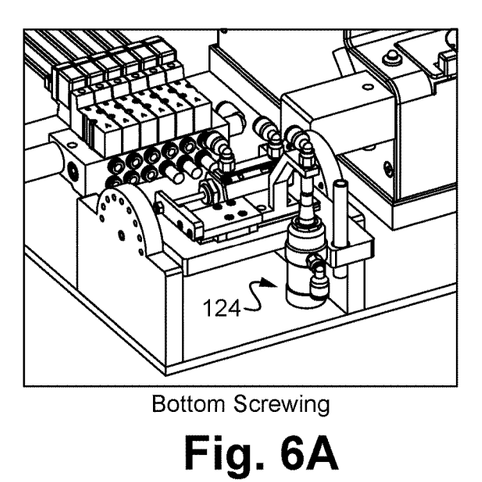
FIGS. 6A-6C illustrate the screw driving unit in action in accordance with some embodiments of the present invention.
Figure 6B:
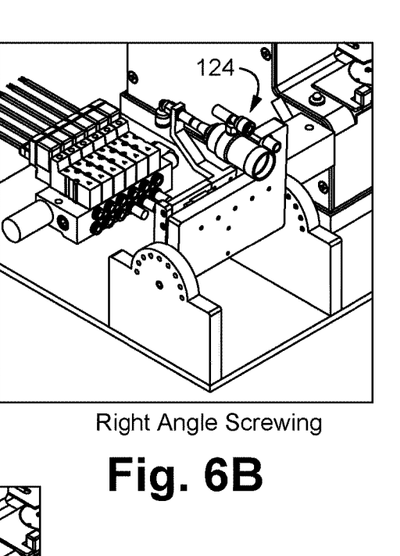
Figure 6C:
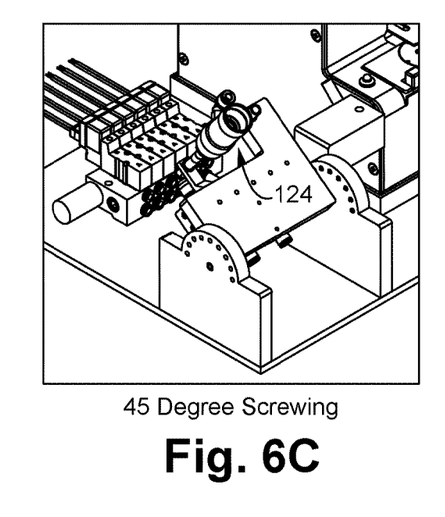

FIGS. 6A-6C illustrate the screw driver 124 in action in accordance with some embodiments of the present invention. FIGS. 6A-6C show that the screw driver 124 is able to make a screwing action in various angles. FIG. 6A shows that the screw driver 124 is able to screw at a straight or bottom screwing action (along z-axis or 0 degree). FIG. 6B shows that the screw driver 124 is able to screw at a right angle (90 degree). FIG. 6C shows that the screw driver 124 is able to screw at an arbitrary screwing action (e.g., 45 degree). A person of ordinary skill in the art would appreciate that the screw driver 124 is able to turn and screw at any predetermined angles with its rotatory axis on the angle screw feeding module 126.

Figure 7:
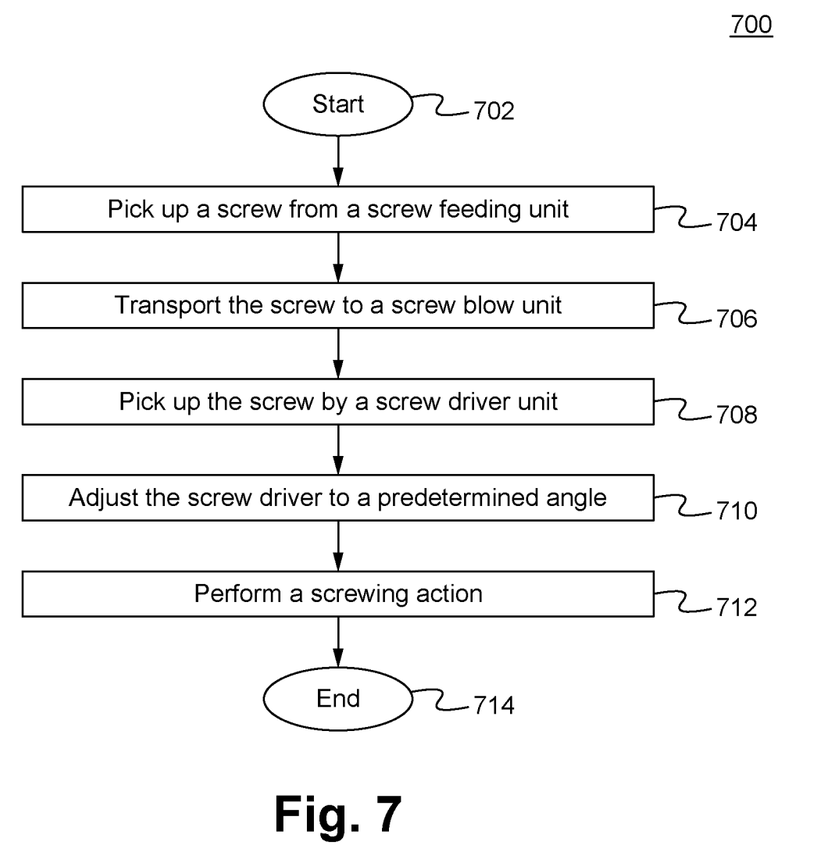
FIG. 7 illustrates an angled screw feeding method 700 in accordance with some embodiments of the present invention.

FIG. 7 illustrates an angled screw feeding method 700 in accordance with some embodiments of the present invention. The method 700 can start at Step 702. At Step 704, a screw is picked from a screw feeding unit. At Step 706, the screw is transported to a screw blow unit. At Step 708, the screw is picked up by a screw driving unit. At Step 710, a predetermined angle of the screw driver on the screw driving unit is adjusted. At Step 712, a screwing action is performed by the screw driver. The method ends at 714.

The device can be utilized alone or with a typical screw driver. The device is able to be utilized to automate an assembling process in a machine manufacturing plant.

In operation, screws are picked up from a screw feeding unit, and transported by a screw transporting unit, and applied by a screw driving unit.

The devices and method disclosed herein comprise advantageous industrial features and applications, such as allowing an industrial assembly line having automation in terms of screw feeding and screwing at any predefined angles, which facilitates the speed and efficiency of product manufacturing.

The present invention has been described in terms of specific embodiments incorporating details to facilitate the understanding of principles of construction and operation of the invention. Such reference herein to specific embodiments and details thereof is not intended to limit the scope of the claims appended hereto. It is readily apparent to one skilled in the art that other various modifications can be made in the embodiment chosen for illustration without departing from the spirit and scope of the invention as defined by the claims.

What is claimed is:

1. A screw feeding device comprising:
   a) a screw feeder;
   b) an electrical screw driver coupled to the screw feeder, wherein the electrical screw driver has a screw driver screwing axis, and an alignment of the electrical screw driver relative to a horizontal plane defines a screw driver screwing angle as an angle between the screw driver screwing axis and the horizontal plane; and
   c) a supporting plate that rotates about a central supporting plate axis, wherein the electrical screw driver is coupled to the supporting plate at a predetermined radial distance distal from the central supporting plate axis, and the electrical screw driver moves along a circular path as the supporting plate rotates about the central supporting plate axis, each position along the circular path corresponds to a different screw driver screwing angle.

2. The device of claim 1, wherein the electrical screw driver is configured to pick up a screw at any screw driver screwing angle along the circular path.

3. The device of claim 1, wherein the electrical screw driver is configured to move in the circular path between 1 and 180 degrees of the screw driver screwing angle.

4. The device of claim 1, wherein the electrical screw driver is configured to move in a complete circle.

5. The device of claim 1, further comprising a screw transporter configured to move a screw from the screw feeder to an angle screw feeder.

6. The device of claim 5, wherein the screw transporter comprises a pneumatic cylinder and a vacuum pick up nozzle.

7. The device of claim 1, wherein the screw feeding device comprises a vacuum indicator configured to indicate a screw picking up event.

8. The device of claim 1, wherein the central supporting plate axis is horizontal.

9. The device of claim 1, wherein the circular path is within a non-horizontal plane.

10. A method of automating a screwing process comprising:
   a) providing a screw from a screw feeder;
   b) transporting the screw from the screw feeder to a screw driver, wherein the screw driver has a screw driver screwing axis, and an alignment of the screw driver relative to a horizontal plane defines a screw driver screwing angle as an angle between the screw driver screwing axis and the horizontal plane;
   c) moving a body of the screw driver to a predetermined screw driver screwing angle, wherein the screw driver is coupled to a supporting plate at a predetermined radial distance distal from a central supporting plate axis about which the supporting plate rotates, and the body of the screw driver moves along a circular path as the supporting plate rotates about the central supporting plate axis, each position along the circular path corresponds to a different screw driver screwing angle; and
   d) performing a screwing action at the predetermined screw driver screwing angle using the screw driver.

11. The method of claim 10, wherein the moving comprises rotating.

12. The method of claim 10, further comprising picking up the screw from the screw feeder using a first vacuum nozzle.

13. The method of claim 12, wherein the first vacuum nozzle couples with a first pneumatic cylinder.

14. The method of claim 13, wherein the first pneumatic cylinder moves in a vertical direction.

15. The method of claim 14, further comprising transporting the screw from the screw feeder to a screw blower.

16. The method of claim 15, further comprising horizontally transporting the screw using a second pneumatic cylinder.

17. A screw feeding device comprising:
   a) a screw feeder;
   b) a first vacuum nozzle coupled to a first pneumatic cylinder, wherein the first vacuum nozzle picks up a screw from the screw feeder by generating a negative pressure and the first pneumatic cylinder moves the screw in a picking up action;
   c) a second pneumatic cylinder to transport the screw to be picked up by a second vacuum nozzle;
   d) an angle screw feeder to transport the screw from the second vacuum nozzle to an electrical screw driver, wherein the electrical screw driver has a screw driver screwing axis, and an alignment of the electrical screw driver relative to a horizontal plane defines a screw driver screwing angle as an angle between the screw driver screwing axis and the horizontal plane; and
   e) a supporting plate that rotates about a central supporting plate axis, wherein the electrical screw driver is coupled to the supporting plate at a predetermined radial distance distal from the central supporting plate axis, and the electrical screw driver moves along a circular path as the supporting plate rotates about the central supporting plate axis, each position along the circular path corresponding to a different screw driver screwing angle.

18. The device of claim 17, wherein the screw feeder comprises a rotating disk.

19. The device of claim 17, wherein the electrical screw driver is capable of picking up the screw by using a negative pressure.

* * * * *